United States Patent [19]

Benkan et al.

[11] Patent Number: 5,028,113
[45] Date of Patent: Jul. 2, 1991

[54] ATTACHING STRUCTURE OF OPTICAL FIBERS IN PHOTOELECTRIC SWITCH

[75] Inventors: Tatsuya Benkan, Kyoto; Hideyuki Suzaki, Ootsu, both of Japan

[73] Assignee: Omron Tateisi Electronics Co., Japan

[21] Appl. No.: 574,520

[22] Filed: Aug. 28, 1990

Related U.S. Application Data

[63] Continuation of Ser. No. 341,556, Apr. 21, 1989, abandoned.

[30] Foreign Application Priority Data

Mar. 30, 1988 [JP] Japan .............................. 63-43589[U]
May 30, 1988 [JP] Japan .............................. 63-72602[U]

[51] Int. Cl.$^5$ .......................... G02B 6/36; G02B 7/26
[52] U.S. Cl. .................. 350/96.20; 350/96.21
[58] Field of Search ............................ 350/96.20, 96.21

[56] References Cited

U.S. PATENT DOCUMENTS

| | | | |
|---|---|---|---|
| 3,885,859 | 5/1975 | Dalgleish et al. | 350/96.21 |
| 4,142,776 | 3/1979 | Cherin et al. | 350/96.21 |
| 4,181,401 | 1/1980 | Jensen | 350/96.21 |
| 4,252,407 | 2/1981 | Bubanko et al. | 350/96.21 |
| 4,515,433 | 5/1985 | Schmidt | 350/96.21 |

Primary Examiner—William L. Sikes
Assistant Examiner—Robert E. Wise
Attorney, Agent, or Firm—Dickstein, Shapiro & Morin

[57] ABSTRACT

An optical fiber attaching structure in a photoelectric switch comprises: an optical fiber supporting member (12) made of an elastic material which is attached to one side portion of a casing (20) of a photoelectric switch and formed with through holes (13, 14) for allowing optical fibers (32, 33) to pass and notches (13a, 13b, 14a, 14b, 14c, 14d, 14e) which are extended from peripheries of the through holes toward the outside in a radial direction; a fastening frame (16) which has a space enough to enclose the optical fiber supporting member and in which openings (17, 18) for allowing the optical fibers to pass are formed at the positions corresponding to the through holes of the optical fiber supporting enclosed in the enclosing space and a screw hole (19) is formed in another plane which is perpendicular to a plane in which the openings are formed; and a pressing screw (31) for fixing the optical fibers which are pierced into the through holes to the optical fiber supporting member by pressing a part of the optical fiber supporting member when the pressing screw is screwed into the screw hole of the fastening frame.

5 Claims, 6 Drawing Sheets

ATTACHING STRUCTURE OF OPTICAL FIBERS IN PHOTOELECTRIC SWITCH

This application is a division of application Ser. No. 07/341,556, filed Apr. 21, 1989, now abandoned.

BACKGROUND OF THE INVENTION

1. Field of the Invention

The present invention relates to a structure to attach optical fibers to a photoelectric switch in which optical fibers are used in a sensor section.

2. Related Background Art

Figure 8:
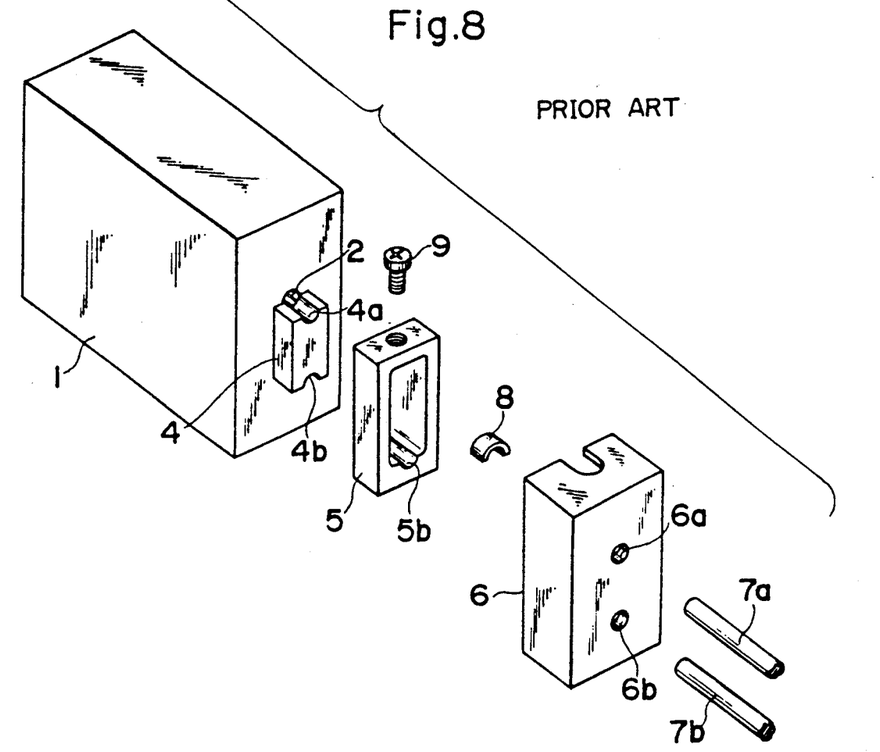
FIG. 8 is an exploded perspective view.
Figure 9:
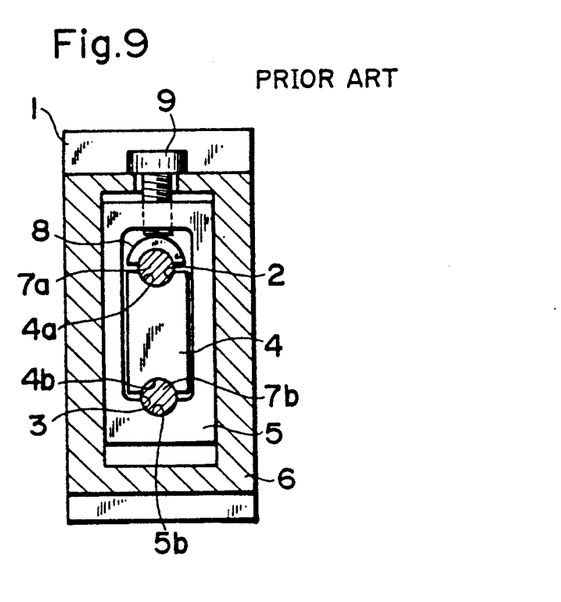
FIG. 9 is a cross sectional view showing a state in which optical fibers are attached and fixed.

In a photoelectric switch using optical fibers, for instance, as disclosed in Japanese Utility Model Registration Application Laid-open Publication No. 62-10342, a structure for attaching optical fibers to a photoelectric switch has been proposed. According to such a structure, as shown in FIGS. 8 and 9, a supporting portion 4 having grooves 4a and 4b each of which has a half circle-shaped cross section which are communicated with optical fiber inserting ports 2 and 3 is projected from an end portion of a casing 1 of the photoelectric switch. A fastening frame 5 which is attached to the supporting portion 4 is provided. A groove 5b having a half circle-shaped cross section and corresponding to the groove 4b is formed on the inner wall of the frame 5. A protection cover 6 having a space enough to enclose the fastening frame 5 and having openings 6a and 6b at the positions corresponding to the optical fiber inserting ports 2 and 3 is fixed to the casing 1 by fixing means (not shown). Optical fibers 7a and 7b are inserted into the openings 6a and 6b. An arc-shaped pressing metal fitting 8 is put onto the supporting portion 4. The pressing metal fitting 8 is fastened to the frame 5 by a fastening screw 9, thereby fixing the optical fibers 7a and 7b.

According to such a conventional optical fiber attaching structure of the photoelectric switch, the arc-shaped pressing metal fitting 8 covers a part of the optical fiber inserting port 2 and becomes an obstacle, so that there is a drawback such that it is difficult to insert the optical fibers and it is troublesome to attach them.

SUMMARY OF THE INVENTION

The present invention is made in consideration of the problems in the conventional attaching structure as mentioned above and it is an object of the invention to enable optical fibers to be certainly and easily attached to the casing of a photoelectric switch.

Another object of the invention is to enable a pair of optical fibers to be attached to an end portion of a photoelectric switch with the same attaching strength.

An optical fiber attaching structure in a photoelectric switch according to the present invention comprises: an optical fiber supporting member made of an elastic material which is attached to one side portion of a casing of a photoelectric switch and formed with through holes for allowing optical fibers to pass and notches which are extended from the peripheries of the through holes toward the outside in the radial direction; a fastening frame which has a space enough to enclose the optical fiber supporting member and in which openings for allowing the optical fibers to pass are formed at the positions corresponding to the through holes of the optical fiber supporting member enclosed in the enclosing space and a screw hole is formed in another plane which is perpendicular to a plane in which the openings are formed; and a pressing screw to fix the optical fibers which are pierced into the through holes to the optical fiber supporting member by pressing a part of the optical fiber supporting member when the pressing screw is screwed into the screw hole of the fastening frame.

According to the present invention, optical fibers to be connected are pierced into the openings of the fastening frame and the through holes of the supporting member. The pressing screw is screwed into the fastening frame. A part of the supporting member is pressed by the pressing screw. Thus, the through holes having the notches are contracted and the optical fibers are fixed by the elastic force of the supporting member.

According to the invention, since the through holes of the optical fiber supporting member are wide before the supporting member is fastened by the pressing screw, the optical fibers can be easily inserted. Then, the optical fibers can be certainly fixed by deforming the supporting member in the fastening frame by screwing the fastening screw. On the contrary, by loosing the fastening screw, the through holes of the optical fiber supporting member are widened and the optical fibers can be easily detached.

The optical fiber supporting member is fixed to the switch casing in the central portion. A pair of through holes are formed in the upper and lower portions of the supporting member. A notch which extends in the lateral direction is similarly formed in each of the through holes. Thus, when the supporting member is fixed by the pressing screw, a pair of optical fibers can be fixed by substantially the same fastening force.

BRIEF DESCRIPTION OF THE DRAWINGS

FIGS. 1 to 4 show an embodiment of the present invention;

FIGS. 5 to 7 show another embodiment of the invention;

FIGS. 8 and 9 show a conventional example;

DETAILED DESCRIPTION OF PREFERRED EMBODIMENTS

Referring to FIGS. 1 to 4, a concave portion 21 is formed on one end surface of a casing 20 of a photoelectric switch. A light projecting device (light emitting diode or semiconductor laser) 22 and a photo sensitive device (photodiode or the like) 23 are attached onto a bottom wall of the concave portion 21. The light projecting device 22 and photo sensitive device 23 are connected to an electric circuit (not shown) provided in the casing 20. Engaging grooves 24 are formed on both of the inner wall surfaces of the concave portion 21, respectively. An attaching member 25 is provided for the lower portion of the one end surface of the casing 20. An engaging groove 25a is formed on the attaching member 25.

Figure 1:
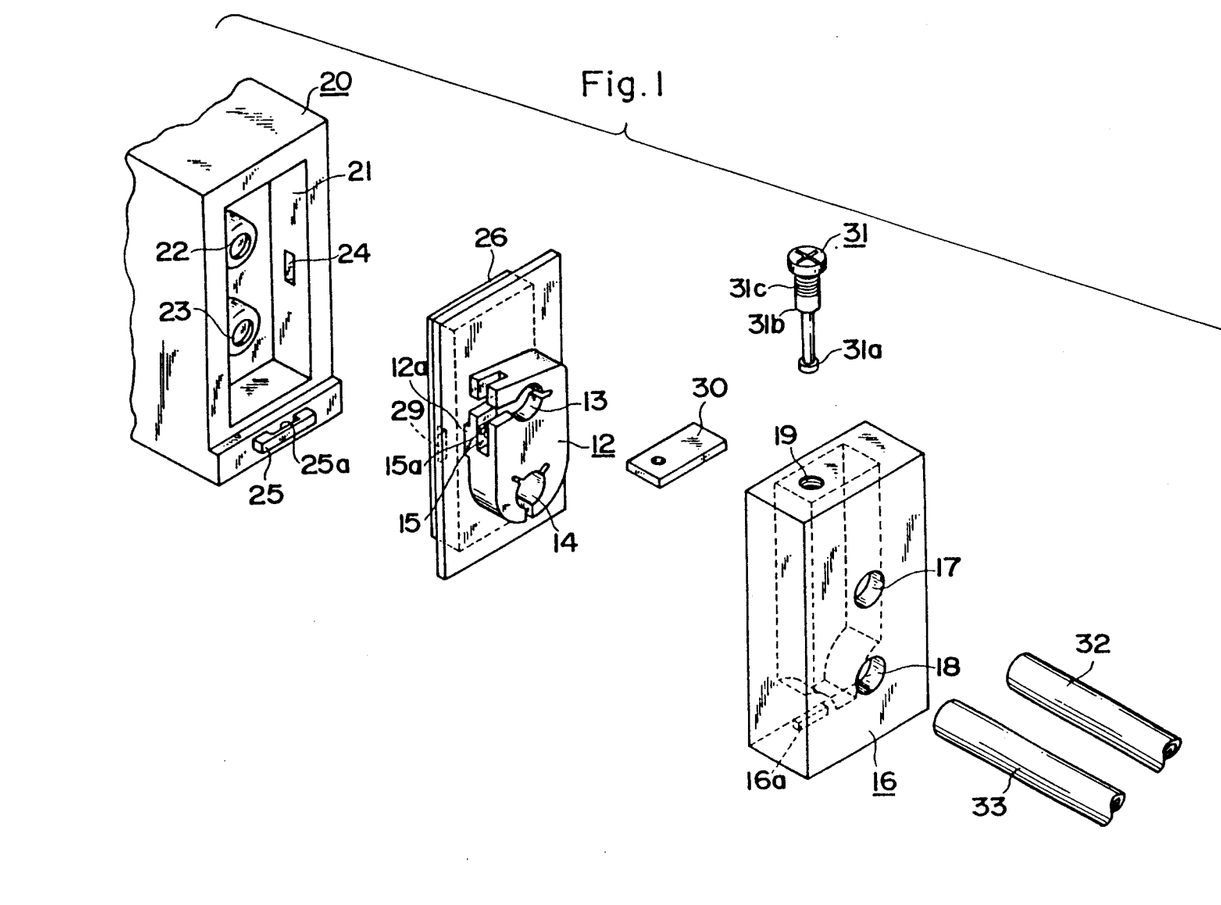
FIG. 1 is an exploded perspective view showing a structure to attach optical fibers to a casing of an optical fiber type photoelectric switch.
Figure 2:
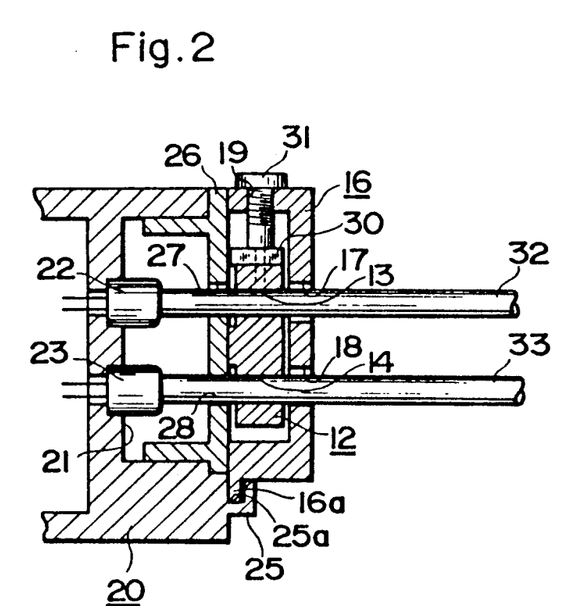
FIG. 2 is a vertical sectional view of the attaching structure.

The concave portion 21 is closed by a cover 26. That is, engaging projections 29 are formed on both side surfaces of the cover 26. When the projections 29 are fitted into the engaging grooves 24, the cover 26 is attached to the one end surface of the casing 20.

Figure 3:
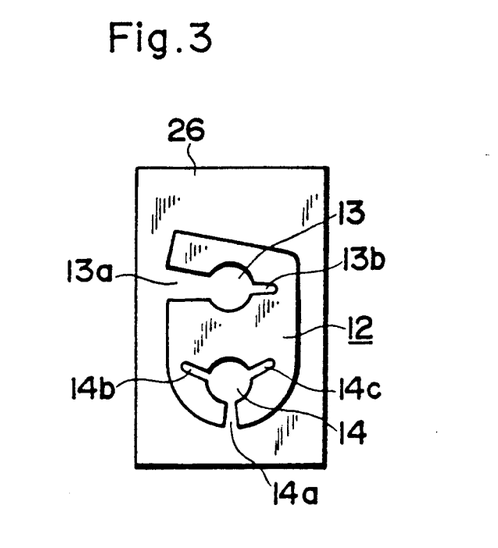
FIG. 3 is a front view of an optical fiber supporting member.

An optical fiber supporting member 12 whose lower end has an almost elliptic shape is provided for the outer surface of the cover 26. The optical fiber supporting member 12 is made of an elastic material. Through holes 13 and 14 having groove-shaped notches 13a, 13b, and 14a to 14c which are radially formed from the central axes to the outside are formed in the supporting member 12, respectively. Diameters of the through holes 13 and 14 are set to be slightly larger than diameters of optical fibers 32 and 33 which are used. The notch 13a of the through hole 13 is opened toward the side of the optical fiber supporting member 12. The notch 14a of the through hole 14 formed in the lower portion of the supporting member 12 is opened toward the lower portion thereof. The supporting member 12 is fixed in its central portion 12a to the cover 26. The upper and lower portions formed with the through holes 13 and 14 are away from the cover 26. Holes 27 and 28 are formed in the cover 26 at the positions corresponding to the through holes 13 and 14, respectively. A groove 15 which pierces the notch 13a is formed on the side portion of the supporting member 12. An engaging projection 15a is formed on the groove 15.

A fastening frame 16 is attached to the optical fiber supporting member 12. The fastening frame 16 is formed into a box shape and has therein a space enough to enclose the supporting member 12. A portion 16b which is projected like an arc is formed on the bottom surface of the fastening frame 16 so as to receive the arc-shaped lower surface of the supporting member 12 at two points. Further, a pair of openings 17 and 18 are formed in the fastening frame 16 at the positions corresponding to the through holes 13 and 14. A screw hole 19 is formed in the upper surface which is perpendicular to the plane in which the openings 17 and 18 are formed. A projection 16a adapted to be fitted into the engaging groove 25a is formed on the lower portion of the fastening frame 16.

A pressing screw 31 comprises: a screw portion 31c which is screwed into the screw hole 19; a large diameter portion 31b which is continuous with the screw portion 31c; and a flange portion 31a which is formed at a lower end of a small diameter portion extending downwardly from the large diameter portion 31b and prevents the pressing screw 31 from being pulled out. On the other hand, a hole whose diameter is smaller than the diameter of the large diameter portion 31b of the pressing screw 31 and is larger than the diameter of the flange 31a is formed in a pressing plate 30.

In this embodiment, when optical fibers are attached, the optical fibers 32 and 33 are first inserted into the openings 17 and 18 of the fastening frame 16, through holes 13 and 14 of the optical fiber supporting member 12, and holes 27 and 28 of the cover 26, respectively. The projection 16a of the fastening frame 16 is fitted into the engaging groove 25a of the attaching member 25. In this case, since the diameters of the through holes 13 and 14 are slightly larger than those of the optical fibers 32 and 33, the optical fibers 32 and 33 can be easily inserted. The tips of the optical fibers 32 and 33 are come into contact with the light projecting and photo sensitive surfaces of the light projecting device 22 and photo sensitive device 23, respectively.

Figure 4:
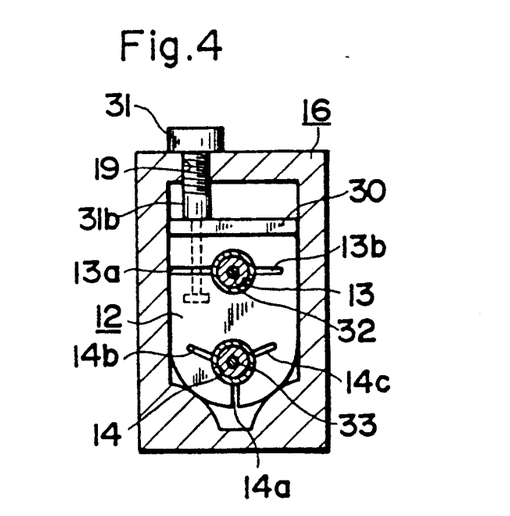
FIG. 4 is a cross sectional view showing a state in which optical fibers are attached and fixed.

The flange portion 31a at the end of the pressing screw 31 is preset in a manner such that the flange 31a at the end of the pressing screw 31 comes into engagement with the projection 15a and the small diameter portion of the screw pierces the hole of the pressing plate 30. Further, the screw 31 pierces the screw hole 19. In such a state, the screw 31 is screwed into the screw hole 19 and the pressing plate 30 is pressed by the large diameter portion 31b, thereby deforming the supporting member 12 in the frame 16 as shown in FIG. 4. Consequently, since the notches 13a, 13b, and 14a to 14c of the optical fiber supporting member 12 are deformed, the optical fibers 32 and 33 are fastened around their entire peripheries and the optical fibers 32 and 33 are fixed. On the other hand, the fastening frame 16 is also fixed to the supporting member 12 through the screw 31.

The flange portion 31a to prevent the pressing screw 31 from being pulled out is provided in the end portion of the screw 31, so that even when the optical fibers are attached and detached, the pressing screw 31 does not drop out. On the other hand, by recovering the deformation of the optical fiber supporting member 12 to the original state by loosing the screw 31, the optical fibers can be easily detached.

In the photoelectric switch, the light emitted from the light projecting device 22 passes through the optical fiber 32 and is led to the outside. The reflected light from an object to be detected passes through the optical fiber 33 and is received by the photo sensitive device 23. In this manner, a switching output due to the detection of the object to be detected is derived.

Figure 5:
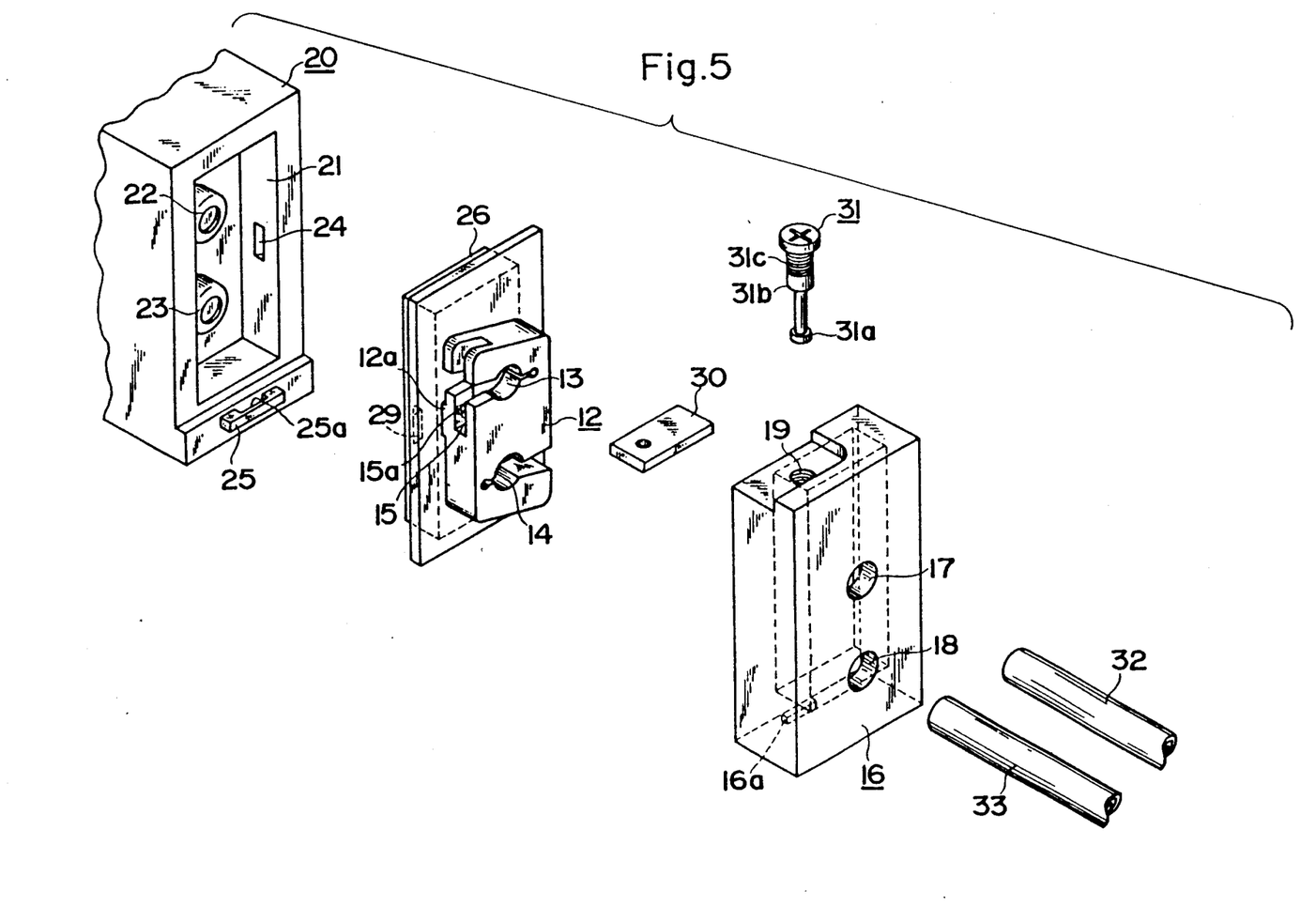
FIG. 5 is an exploded perspective view showing a structure to attach optical fibers to a casing of an optical fiber type photoelectric switch.
Figure 6:
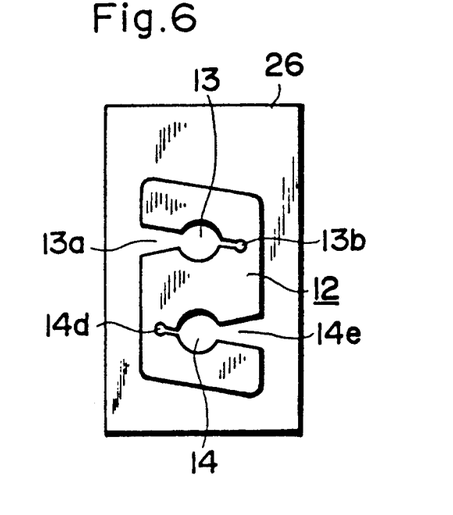
FIG. 6 is a front view of an optical fiber supporting member.
Figure 7:
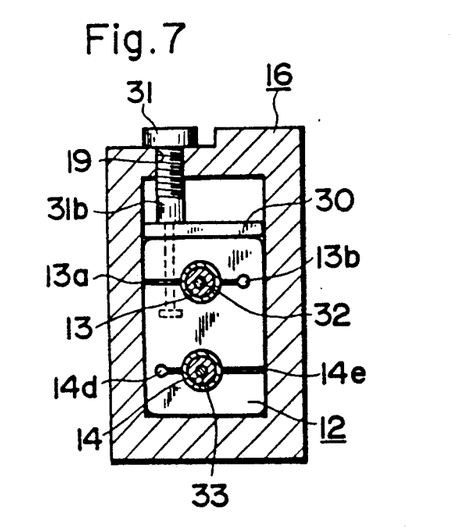
FIG. 7 is a cross sectional view showing a state in which optical fibers are attached and fixed.

FIGS. 5 to 7 show another embodiment. When comparing the embodiment with the foregoing first embodiment, the shape of the optical fiber supporting member 12 and the notches formed in the through holes 13 and 14 differ. The through hole 13 in the upper portion and the notches 13a and 13b are the same as those shown in FIGS. 1 to 4. Two notches 14d and 14e are also almost horizontally formed in the through hole 14 in the lower portion. The notch 14e is opened toward the right side. In a state before the optical fibers 32 and 33 are attached, the optical fiber supporting member 12 is set into an almost parallelogram.

The bottom surface of the fastening frame 16 is flat. A concave portion 16c in which the head of the screw 31 is located is formed on the upper surface of the frame 16.

According to the above structure, the optical fibers 32 and 33 can be also fixed by fastening the pressing screw 31 in a manner similar to the foregoing first embodiment. In the second embodiment, the upper and lower through holes 13 and 14 and notches 13a, 13b, 14d, and 14e are formed symmetrically with respect to the vertical direction. The supporting member 12 is attached to the cover 26 in only the central portion 12a. Therefore, even when the pressing screw 31 is fastened, the centers of the optical fibers 32 and 33 are not changed. The optical fibers 32 and 33 can be attached and fixed without causing a deviation of the optical axes.

What is claimed is:

1. A structure for attaching optical fibers in a photoelectric switch, comprising:

an optical fiber supporting member made of an elastic material which is attached to one side portion of a casing of a photoelectric switch and formed with through holes for allowing optical fibers to pass and notches which are extended for peripheries of said through holes toward the outside of said supporting member in a radial direction;

a fastening frame which has an enclosing space large enough to enclose said optical fiber supporting member and in which openings for allowing the optical fibers to pass are formed at positions corresponding to said through holes of said optical fiber supporting member enclosed in said enclosing space and a screw hole is formed in another plane which is perpendicular to a plane in which said openings are formed; and a pressing screw for fixing the optical fibers which pass through said through holes to said optical fiber supporting member whereby said enclosing space of said fastening frame is defined to allow optical fibers to pass through said through holes of said optical fiber supporting member in said fastening frame and to deform said optical fiber supporting member in said fastening frame such that the optical fibers passing through said through holes are pressed and held by said optical fiber supporting member when said pressing screw is screwed into said screw hole of said fastening frame to press the optical fiber supporting member.

2. An attaching structure according to claim 1, wherein said optical fiber supporting member (12) has an engaging portion (15a) for the pressing screw, and the pressing screw has a flange (31a) which comes into engagement with said engaging portion and prevents the pressing screw from being removed.

3. An attaching structure according to claim 1, wherein a detachable cover member (26) is provided for one side portion of the casing of the photoelectric switch, and said optical fiber supporting member is fixed to said cover member.

4. An attaching structure according to claim 1, further comprising means (16a, 25, 25a) for attaching said fastening frame (16) to the casing of the photoelectric switch.

5. An attaching structure according to claim 1, wherein at least one of said notches (13a, 14a) of each of said through holes opens with a gap at a side of said optical fiber supporting member to facilitate insertion of said optical fibers in said through holes.

* * * * *

UNITED STATES PATENT AND TRADEMARK OFFICE
CERTIFICATE OF CORRECTION

PATENT NO. : 5,028,113
DATED     : July 2, 1991
INVENTOR(S) : TATSUYA BENKAN and HIDEYUKI SUZAKI It is certified that error appears in the above-identified patent and that said Letters Patent is hereby corrected as shown below:

On title page item
[73] At Assignee

"Omron Tateisi Electronics Co., Japan" should read --Omron Tateisi Electronics Co., Kyoto, Japan--.
On title page item
[30] At Foreign Application Priority Data "Mar. 30, 1988 [JP] Japan .... 63-43589" should be deleted.

Signed and Sealed this

Sixteenth Day of February, 1993

Attest:

STEPHEN G. KUNIN

*Attesting Officer*    Acting Commissioner of Patents and Trademarks